United States Patent [19]
Numata et al.

[11] 3,928,860
[45] Dec. 23, 1975

[54] EXPOSURE CONTROL CIRCUIT FOR PHOTOGRAPHIC CAMERA

[75] Inventors: Saburo Numata; Shinichiro Fujino, both of Urawa, Japan

[73] Assignee: Fuji Photo Optical Co., Ltd., Omiya, Japan

[22] Filed: Feb. 21, 1975

[21] Appl. No.: 551,904

Related U.S. Application Data

[63] Continuation of Ser. No. 398,937, Sept. 20, 1973, abandoned.

[30] Foreign Application Priority Data
Sept. 26, 1972 Japan.............................. 47-96472

[52] U.S. Cl................................. 354/51; 354/60 R
[51] Int. Cl.².............................................. G03B 7/08
[58] Field of Search....................... 354/50, 51, 60 R

[56] References Cited
UNITED STATES PATENTS

| | | |
|---|---|---|
| 3,690,230 | 9/1972 | Mori et al............................ 354/51 |
| 3,736,851 | 6/1973 | Ono et al............................. 354/51 |
| 3,855,603 | 12/1974 | Ichihashi............................. 354/51 |

*Primary Examiner*—Joseph F. Peters, Jr.
*Assistant Examiner*—James LaBarre

[57] ABSTRACT

A balancing capacitor or capacitors are connected with the input and/or the output of an operational amplifier of an electric shutter control circuit of a photographic camera. The balancing capacitor is connected between the input of the operational amplifier and a power supply or the ground. The balancing capacitor may be connected between the output of the operational amplifier and the power supply. The capacitor connected between the output of the amplifier and the power supply also serves to partly precharge a memorizing capacitor before the operation of the circuit, and is cut from the supply when the circuit is put into operation. In a variation of the invention, the operational amplifier is connected with balancing capacitors at both the input and output terminals of the amplifier.

10 Claims, 6 Drawing Figures

PRIOR ART   FIG.1
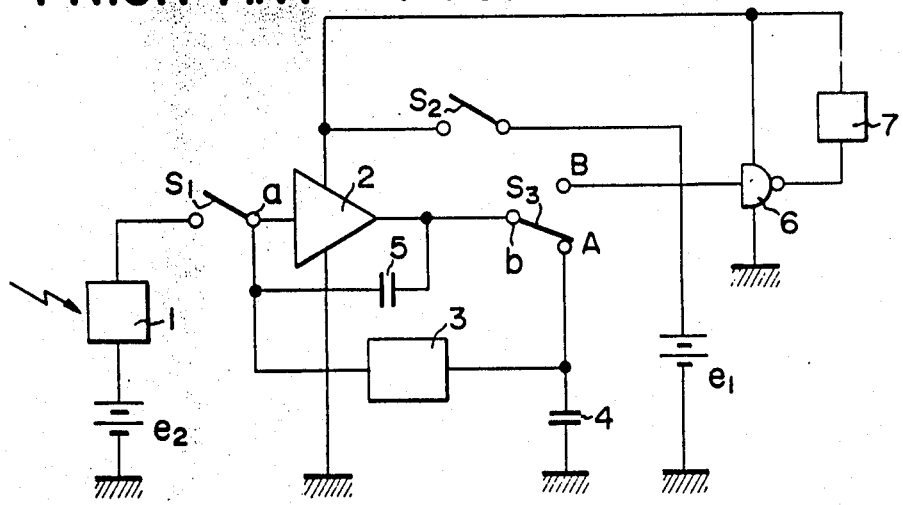
FIG.2
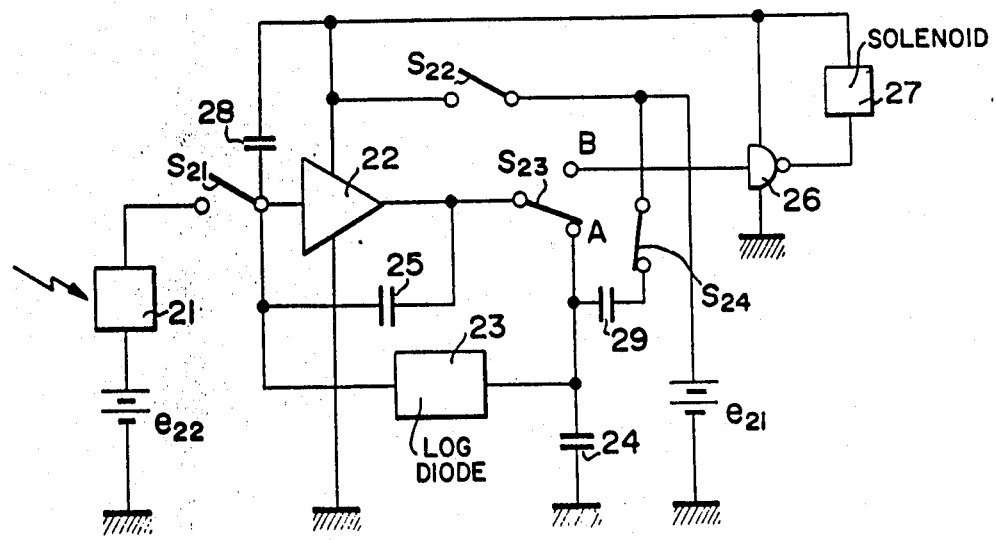

EXPOSURE CONTROL CIRCUIT FOR PHOTOGRAPHIC CAMERA

This is a continuation of application Ser. No. 398,937, filed Sept. 20, 1973, now abandoned.

BACKGROUND OF THE INVENTION

1. Field of the Invention

This invention relates to an exposure control circuit for a photographic camera, and more particularly to an improvement in a photoelectric shutter speed control circuit for a photographic camera including a photo senser, an operational amplifier to amplify the input voltage determined by the resistance of the photo senser representing the illuminance of the subject to be photographed, a memorizing capacitor connected with the amplifier, and switching means to actuate a solenoid to operate a shutter means in accordance with the information memorized by the capacitor.

2. Description of the Prior Art

It has been well known in the art to photoelectrically control the exposure time or shutter speed in a photographic camera by use of an electric circuit including a photo senser. One of the conventional electric shutter speed control circuits is shown in FIG. 1, in which a photo senser 1, such as a photo-diode and a CdS photoelectric conversion element, is connected with a constant voltage power source $e_2$ at an end thereof and with an operational amplifier 2 by way of an input switch $S_1$. The operational amplifier 2 is connected in parallel with a logarithmic diode 3 and in series with a memorizing capacitor 4 which in turn is grounded. Across the operational amplifier 2 is connected an integrating capacitor 5. Between the connecting point of the memorizing capacitor 4 and the logarithmic diode 3, and the output of the operational amplifier 2, is connected a change-over switch $S_3$ for short-circuit between a contact $b$ of the output of the operational amplifier 2 and a contact A of said connecting point. The change-over switch $S_3$ is selectively put into contact with said contact A or a contact B connected with a driver 6 which is in turn connected with a solenoid 7. The solenoid 7 is connected with a power supply $e_1$ by way of a power switch $S_2$. Said operational amplifier 2 and said driver 6 are connected with the power supply $e_1$ by way of the power switch $S_2$ and grounded.

In operation, the input switch $S_1$ is first turned on and the change-over switch $S_3$ is moved into the contact A. Then, upon depression of a shutter button, the power switch $S_2$ is turned on to supply the power to the operational amplifier 2 and the driver 6. The input voltage of the operational amplifier 2 is determined in accordance with the resistance of the photo senser which receives light from the subject to be photographed. The input voltage at the contact $a$ of the operational amplifier is amplified through the amplifier and a voltage representing the illuminance is memorized in the memorizing capacitor 4 through the logarithmic diode 3. After the voltage is charged and memorized in the capacitor 4, the change-over switch $S_3$ is switched to the contact B of the driver 6 and the input switch $S_1$ is turned off. These changes in switches $S_1$ and $S_3$ are performed in response to the swinging up of a mirror, for instance, in a single lens reflex camera. Further, in response to the swinging up of the mirror, the leading curtain of a focal plane shutter starts to travel. Then, the voltage across the integrating capacitor 5 and accordingly the input voltage of the driver 6 rises as the time lapses. The time taken for the input voltage of the driver 6 to reach the predetermined level depends upon the level of the charge memorized by the capacitor 4. The higher the charged level, the shorter the time. When the voltage reaches a predetermined level the driver 6 is energized to actuate the solenoid 7 which releases a trailing curtain. Thus, the shutter speed or exposure time is controlled automatically in accordance with the value of illumination measured by the photo senser. In response to completion of the travel of the trailing curtain, the swing mirror is moved down, back to the original position. Upon backward movement of the swing mirror, the input switch $S_1$ is moved back to the original closed position and the change-over switch $S_3$ is switched back to the contact A from B. At the same time, the power supply switch $S_2$ is turned off. Thus, the circuit is put into the original state ready for the next shot.

In the exposure control circuit as described above, there has been great difficulty in controlling the exposure time accurately at the initial stage of the operation, particularly when the input voltage of the operational amplifier 2 is small. This is because it takes a comparatively long time for the input voltage of the operational amplifier to rise up to the final operating voltage, since a large capacitance is inherent in the photo senser and the integrated circuit of the operational amplifier, and the capacitances are unbalanced with respect to the input voltage of the amplifier. In other words, because of the unbalance in capacitance before and after the input of the operational amplifier, the period for the input voltage of the amplifier to reach the operating voltage is lengthy. If the period is too long, the final operating voltage is not built up in time to be put into the operational amplifier and accordingly the circuit does not work accurately and a correct exposure cannot be obtained. In order to obtain the correct exposure, the photographer must wait until the input voltage rises up to the operating voltage by half-depressing the shutter button.

SUMMARY OF THE INVENTION

In light of the above defect inherent in the conventional exposure control circuit for a photographic camera, the primary object of the present invention is to provide an improved exposure control circuit for a photographic camera in which the input voltage of the operational amplifier is quickly raised up to the final operating voltage so that a correct exposure may be instantly obtained.

Another object of the present invention is to provide an exposure control circuit for a photographic camera in which a memorizing capacitor is partly precharged to make a quick response or operation of the capacitor so that a correct exposure may be quickly obtained.

Still another object of the present invention is to provide an exposure control circuit for a photographic camera which has a quick response to the variation in illuminance of the subject to be photographed.

A further bject of the present invention is to provide an exposure control circuit for a photographic camera which has a quick response even against low illumination and accordingly is suitable for taking pictures under comparatively low illumination.

In accordance with the present invention, the above objects are accomplished by connecting an additional capacitor or capacitors to the input and/or the output of the operational amplifier to balance the capacitance before and after the input of the operational amplifier. By obtaining the balance in capacitance, the input voltage of the operational amplifier instantly rises up to the final operating voltage upon supply of the power to the operational amplifier. Accordingly, there is no need to wait after depression of the shutter button to obtain the steady-state voltage.

Further, in accordance with an embodiment of the present invention in which an additional capacitor is connected with the output of the operational amplifier, an electrolytic capacitor for memorizing the input information is partly pre-charged to make a quick response to the operation of the circuit.

Other objects, features and advantages of the present invention will be made apparent from the following detailed description of the preferred embodiments thereof taken in conjunction with the accompanying drawing except FIG. 1 showing a circuit view of a prior art described hereinabove.

BRIEF DESCRIPTION OF THE DRAWING

FIG. 1 is a circuit view showing an exposure control circuit of the prior art;

FIG. 2 is a circuit view showing an embodiment of the improved exposure control circuit for a photographic camera in accordance with the present invention;

FIG. 6 is a circuit view showing a further embodiment of the exposure control circuit of the invention.

DESCRIPTION OF THE PREFERRED EMBODIMENTS

Figure 3:
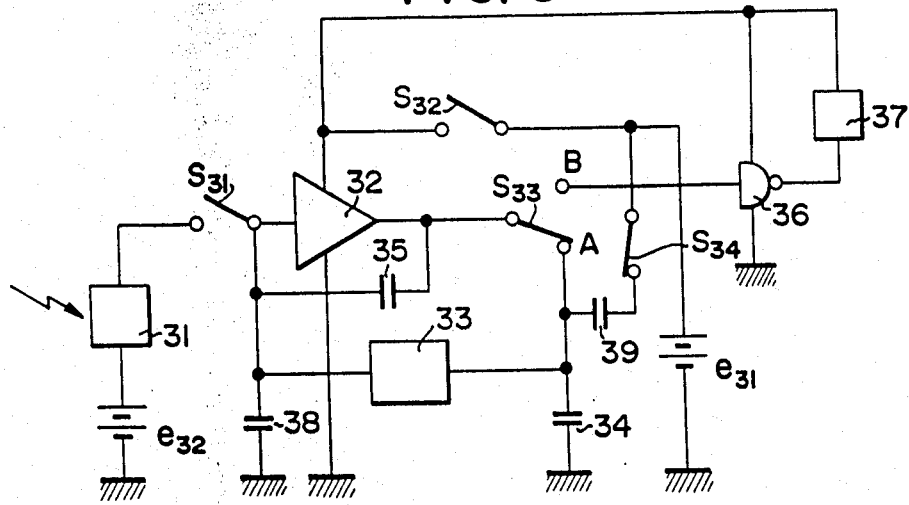
FIG. 3 is a circuit view showing another embodiment of the exposure control circuit of the invention.

Referring to FIG. 2 showing an embodiment of the exposure control circuit for a camera in accordance with the present invention, in which the same elements as those shown in FIG. 1 are indicated with similar reference numerals, an additional capacitor 28 is connected between the input terminal of the operational amplifier 22 and a power supply switch $S_{22}$. In addition to the capacitor 28, another capacitor 29 is connected between the power supply $e_{21}$ and the output of the operational amplifier 22. Between the said capacitor 29 and the output of the amplifier 22 is connected a change-over switch $S_{23}$, and between the power supply $e_{21}$ and the said capacitor 29 is connected a switch $S_{24}$. The switch $S_{24}$ is normally closed and only opened when the shutter is released. Practically, the switch $S_{24}$ is preferably opened upon depression of a shutter button and closed upon completion of the travel of the trailing curtain or backward movement of the swing mirror.

The capacitance of the capacitors 28 and 29 is so selected as to effect a balance in capacitance before and after the input of the operational amplifier 22. Therefore, in operation, the input voltage of the operational amplifier 22 is instantly raised up to the operating voltage, and accordingly the correct exposure is quickly obtained accurately.

Besides, the capacitor 29 connected with the output of the operational amplifier 22 serves to partly precharge a memorizing capacitor 24 before the circuit is put into operating state. Particularly, in case an electrolytic capacitor is used as the memorizing capacitor 24, it is desirable to partially precharge the memorizing capacitor 24 in order that the capacitor 24 may perform a quick and steady response to the operation of the circuit. The level of the precharge is selected to be at least lower than the lowest possible level which corresponds to the practically possible longest exposure time. Although the switch $S_{24}$ is normally closed, there is no fear of waste of power since a current does not flow through the capacitor 29 after the capacitor 29 is charged up.

The elements which are shown in FIG. 2 and have not been described hereinabove are all the same as those shown in FIG. 1 and accordingly the detailed description of the elements are omitted here. The same elements shown in FIGS. 3 to 5 as those shown in FIG. 2 which are indicated with similar numerals are exactly the same in construction and operation thereof, and accordingly, the detailed description of those elements is also eliminated in the specification.

Figure 4:
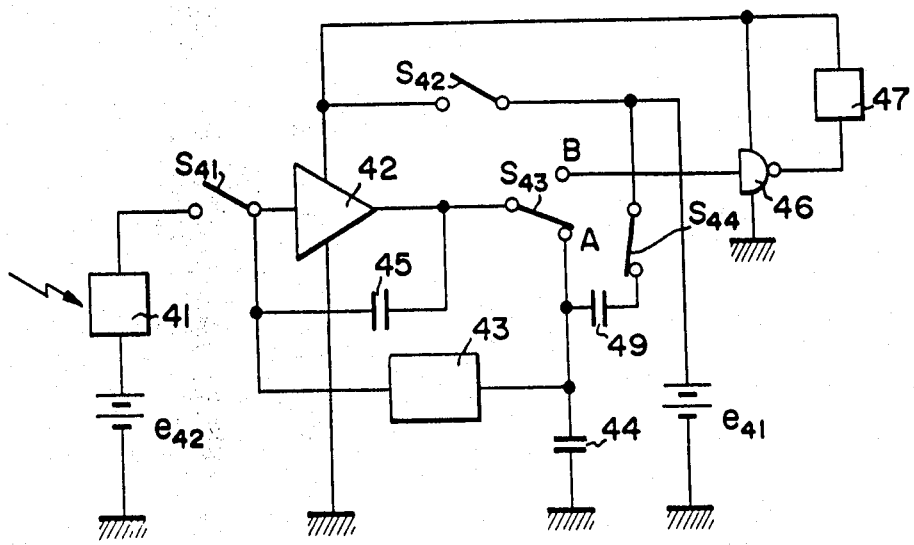
FIG. 4 is a circuit view showing still another embodiment of the exposure control circuit of the invention in which an additional capacitor is connected only with the output of the operational amplifier.

Referring to FIG. 3 showing another embodiment of the present invention, an additional capacitor 38 on the input-side is connected between the input of the operational amplifier 32 and the ground instead of the power supply. It will be readily understood that the capacitor 28 in the first embodiment may be replaced by the capacitor 38 of the second embodiment, and further that both the capacitor 28 and the capacitor 38 may be connected with the input of the operational amplifier 42. Further, it will be understood that both the capacitors 28 and 38 may be eliminated if a capacitor connected with the output of the amplifier is properly selected. FIG. 4 shows such an embodiment, in which a capacitor 49 serves to balance the capacitance at the input of the amplifier 42 as well as to precharge a memorizing capacitor 44.

Figure 5:
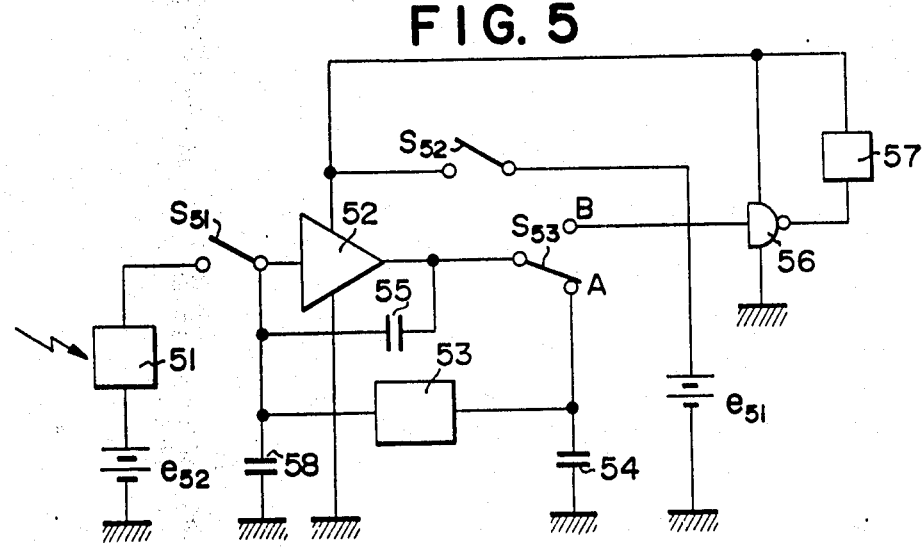
FIG. 5 is a circuit view showing a further embodiment of the exposure control circuit of the invention in which an additional capacitor is connected only with the input of the operational amplifier.

In case the memorizing capacitor is not an electrolytic capacitor, there is no need to precharge the memorizing capacitor and accordingly there is no need to provide an additional capacitor at the output of the operational amplifier such as the capacitor 29, 39 or 49. FIG. 5 shows one such example, in which a capacitor 58 is connected between the input of the operational amplifier 52 and the ground. The capacitor 58 serves to balance the capacitance at the input of the operational amplifier 52. Further, as obvious from the above description of several embodiments, the present invention can be effected by, as shown in FIG. 6, connecting a capacitor 68a between the input of the operational amplifier 62 and the ground, and a capacitor 68b between the input of the operational amplifier 62 and the power supply $e_{61}$. These capacitors 68a and 68b serve to balance the capacitance at the input of the operational amplifier 62.

What is claimed is:

1. An exposure control circuit for a photographic camera including a photo senser, an operational amplifier operatively connected between a power supply and ground and with the photo senser to amplify the input voltage thereof determined by the resistance of the photo senser which represents the light value from the subject to be photographed, a memorizing capacitor connected with the output of the operational amplifier and switching means for disconnecting the photo senser from the operational amplifier in response to the opening of the shutter of the camera and connecting the memorizing capacitor to a shutter closing means which operates to close the shutter when the input voltage of the switching means reaches a predetermined level whereby the time until the shutter closing means is energized is controlled in accordance with the value of illumination incident upon the photo senser, characterized in that at least one of the input terminal and the output terminal of the operational amplifier has a balancing capacitor having one side connected therewith, the other side of said balancing capacitor being connected to said power supply so as to effect a balance in capacitance between the input from the photo senser to the operational amplifier and the output of the operational amplifier, whereby the input voltage of the operational amplifier is instantly raised up to the operating voltage upon energization of the circuit.

2. An exposure control circuit for a photographic camera as defined in claim 1 wherein said balancing capacitor is a capacitor connected between the input of the operational amplifier and the power supply of the amplifier.

3. An exposure control circuit for a photographic camera as defined in claim 1 wherein said balancing capacitor is a capacitor connected between the power supply of the amplifier and the output of the amplifier.

4. An exposure control circuit for a photographic camera as defined in claim 3 wherein a normally closed switch is connected between the power supply and said capacitor between the output and the power supply, said switch being opened in response to release of the shutter of the camera.

5. An exposure control circuit for a photographic camera as defined in claim 4 further comprising an additional balancing capacitor connected with the input of the amplifier.

6. An exposure control circuit for a photographic camera as defined in claim 5 wherein said additional balancing capacitor is connected between the input and the power supply of the operational amplifier.

7. An exposure control circuit for a photographic camera as defined in claim 5 wherein said additional balancing capacitor is connected between the input of the operational amplifier and the ground.

8. An exposure control circuit for a photographic camera including a photo senser, an operational amplifier operatively connected between a power supply and ground and with the photo senser to amplify the input voltage thereof determined by the resistance of the photo senser which represents the light value from the subject to be photographed, a memorizing capacitor connected with the output of the operational amplifier and switching means for disconnecting the photo senser from the operational amplifier in response to the opening of the shutter of the camera and connecting the memorizing capacitor to a shutter closing means which operates to close the shutter when the input voltage of the switching means reaches a predetermined level whereby the time until the shutter closing means is energized is controlled in accordance with the value of illumination incident upon the photo senser, characterized in that at least one of the input terminal and the output terminal of the operational amplifier has a balancing capacitor having one side connected therewith, the other side of said balancing capacitor being connected to said ground so as to effect a balance in capacitance between the input from the photo senser to the operational amplifier and the output of the operational amplifier, whereby the input voltage of the operational amplifier is instantly raised up to the operating voltage upon energization of the circuit.

9. An exposure control circuit for a photographic camera as defined in claim 8 wherein said balancing capacitor is a capacitor connected between the input of the operational amplifier and the ground.

10. An exposure control circuit for a photographic camera as defined in claim 9 further comprising a capacitor connected between the input of the operational amplifier and the power supply of the amplifier.

* * * * *